United States Patent [19]

Chase et al.

[11] 3,948,673

[45] Apr. 6, 1976

[54] WATER SOLUBLE SIZING FOR GLASS FIBERS AND GLASS FIBERS SIZED THEREWITH

[75] Inventors: Kenneth P. Chase; William N. Stassen, both of Newark, Ohio

[73] Assignee: Owens-Corning Fiberglas Corporation, Toledo, Ohio

[22] Filed: Oct. 19, 1973

[21] Appl. No.: 408,235

[52] U.S. Cl. .................................. 106/99; 106/90
[51] Int. Cl.² ........................................ C04B 7/02
[58] Field of Search .......................... 106/99, 90

[56] References Cited
UNITED STATES PATENTS

| | | | |
|---|---|---|---|
| 2,681,863 | 6/1954 | Croce et al. | 106/99 |
| 2,738,285 | 3/1956 | Biefeld et al. | 106/99 |
| 2,793,130 | 5/1957 | Shannon et al. | 106/99 |
| 3,716,386 | 2/1973 | Kempster | 106/99 |

*Primary Examiner*—J. Poer
*Attorney, Agent, or Firm*—John W. Overman; Philip R. Cloutier

[57] ABSTRACT

Glass Fibers sized with water soluble polymeric compositions to maintain strand integrity during processing and to induce complete filamentization of the glass fibers from a bundle during blending and mixing of the glass fiber bundle with an aqueous medium.

19 Claims, No Drawings

WATER SOLUBLE SIZING FOR GLASS FIBERS AND GLASS FIBERS SIZED THEREWITH

BACKGROUND OF THE INVENTION

This invention relates to sizings for glass fibers and particularly to the sized glass fibers which are combined with aqueous media, such as cementitious products, including sodium silicate, calcium silicate, cement, concrete and gypsum to form reinforced inorganic matrices and to form paper products, such as sheet material.

The prior art has employed glass fibers at low concentrations to reinforce inorganic media but these glass fibers were generally sized with starch-containing materials. These sized glass fibers however, were not without their problems, such as lack of filamentization of the glass fibers from their bundles, whereby the potential of the available surface area of the glass fibers to serve as a reinforcement could not be attained. Furthermore, attempts to use glass fibers as a reinforcement in aqueous media in the form of textured yarn, which did not filamentize but which had greater surface area per unit length exposed to the media than untextured yarn in order to overcome the above problems, were expensive. However, these textured yarns, although providing loops and voids for mechanical locking of the glass fibers into the matrix, were not realizing their effective potential surface area, because of lack of filamentization of the textured yarns.

The above problems are overcome by the concepts of this invention, wherein the sized glass fibers remain integral during processing operations, such as drying, chopping, packaging and shipping. Further processing steps which the sized glass fibers may be exposed to include the steps of running a strand from a package and combining the same with a multiplicity of other strands from other packages and forming a roving, followed by a subsequent collection of the roving on a package and/or chopping the roving to length. The roving, even though it comprises a multiplicity of bundles of glass fibers, has the capability of complete filamentization during blending and mixing with the aqueous inorganic medium to maximize its reinforcement potential. The sized glass fibers of this invention are used at relatively high concentrations of from about 1 percent to about 99 percent by weight as compared to the prior art, without clumping of the glass fibers occurring upon mixing the glass fibers into the media.

U.S. Pat. No. 3,716,386, issued on Feb. 13, 1973, discloses a process for preparing a fibrous cementitious mix, wherein fibers (glass) of the mix are immersed in a solution of polyethylene oxide or methyl cellulose prior to incorporation of the glass fibers into the mix. In this teaching, however, the fiber treatment is not a sizing applied at the time of forming the glass fibers, but rather is a post-treatment or secondary treatment, thereby indicating that the glass fibers have a sizing thereon in addition to the post-treatment. It is not known whether that sizing is water soluble, although the post-treatment is water soluble.

The concepts of the present invention, however, require that the sizings comprise a water soluble polymer, and that the glass fibers be preferably dried prior to use. Upon incorporation of the sized glass fibers of this invention into an aqueous media, time is required for the polymer to absorb sufficient water to cause solvation, which thereby induces filamentization of the glass fibers from the strands.

The sizings of this invention provide processing and end-product properties to the sized glass fibers so that the glass fibers may be collected on a package, dried, chopped, or be combined with other strands to form a roving. Additionally, upon incorporation into an aqueous media, the sized glass fibers in the form of strands, bundles, and rovings, undergo instantaneous or delayed filamentization, whichever is desired for a particular process. In either situation, filamentization of the sized glass fibers is achieved without clumping.

SUMMARY OF THE INVENTION

This invention discloses the use of water soluble polymers as essential components in coatings for glass fibers, which glass fibers, especially upon chopping into small unit lengths of from ⅛ inch to about 1 inch, remain integral during processing. However, the sized glass fibers, after incorporation into and mixing in an aqueous inorganic medium fully filamentize from their bundles, strands and rovings, so that the maximum glass fiber surface is available to reinforce the inorganic medium.

The water soluble polymers used in this invention function as a film former and/or lubricant for the glass fibers in order to impart processability characteristics to the glass fibers. In addition, the polymers impart desirable end-product properties to the glass fibers to improve the performance of the glass fibers as a reinforcement in inorganic matrices.

The water soluble polymers should be capable of a relatively high rate of solution in the aqueous medium which rate of solution is either characteristic of the polymers themselves or is realized by at least partial neutralization of the polymers by the addition of acids or bases thereto. Furthermore, the sizing composition itself can be modified by the addition of other materials which will increase the polymers' solution rates by reducing the interaction of the polymer chains among themselves, such as with a plasticizer.

The practice of this invention yields advantages which are not obtainable by prior art teachings. Specifically, under the concepts of this invention, sized glass fiber strands, or bundles of strands, can withstand processing operations and are able to undergo filamentization when combined with aqueous inorganic media. The rate of filamentization of the individual glass fibers from the glass fiber strands or bundles is based upon the rate of solution of the dried sizing or coating on the glass fibers into the aqueous media. The rate of solution of the dried coating can be altered by modifying the polymer used in the sizings and/or by at least partially neutralizing the sizing composition, such as by controlling the pH of the sizing composition, or by adding a material such as a plasticizer thereto. In some instances, the particular water soluble polymer will possess the desired solution rate for the particular process conditions without having to adjust its solution rate.

The rate of filamentization of the glass fibers from the glass fiber bundle and/or the rate of solution of the dried sizing into the aqueous matrix is dependent upon the particular matrix to be reinforced and/or upon the particular end-use of the sized glass fibers. Specifically, when the sized glass fibers are to be used as a reinforcement in cementitious products such as in calcium silicate matrices, it is desired to have a relatively fast rate of solution. However, the rate of solution must not be so fast as to inhibit sufficient dispersion of glass fiber bundles throughout a matrix. That is, filamentization of the glass fibers from the bundles prior to the bundles being fully mixed into the matrix is undesirable, otherwise clumping of the glass fibers can occur.

It is therefore an object of this invention to provide glass fibers in the form of strands, bundles, and rovings with the capability of remaining integral during processing and with the capability of filamentization upon, or preferably after being incorporated, with mixing, into an aqueous inorganic medium, to increase the potential or efficiency of the glass fibers as a reinforcement.

It is another object of this invention to be able to control the rate of filamentization of the sized glass fibers from the strands, bundles, and rovings after the strands, bundles, and rovings are combined with aqueous inorganic media in order to work within established processing procedures inherent with the inorganic media.

It is yet another object of this invention to provide sizing compositions comprising as essential ingredients, water soluble polymers, which polymers, after being dried in situ on the glass fibers, are capable of going into solution with the aqueous inorganic media with controlled rates of solution.

It is still another object of this invention to provide glass fiber reinforced inorganic matrices wherein the glass fibers are uniformly and fully dispersed within the inorganic matrices.

Generally, any polymers that are water soluble can be used with the concepts of this invention. However, the polymers must have a rate of solution in the particular aqueous medium slow enough to allow the sized glass fibers to remain in integral bundles upon incorporation into an aqueous matrix to obtain a uniform dispersion of the bundles therein, but fast enough to thereafter obtain rapid filamentization of the glass fibers from the bundles with minimum agitation. Upon agitating the glass fiber bundles in the matrix, filamentization of the glass fibers from the bundles occurs when the polymer goes into solution, thereby allowing the glass fibers to fully disperse upon continued agitation.

The rate of solution of the polymers is generally dependent upon their molecular weight and solubility characteristics, both of which can be modified to obtain the desired rate of solution. In the latter case, the solubility of the polymer can be modified by neutralization of the acidic or basic groups on the polymers and/or by variation in the choice of the particular counterion of the acid or base used in the neutralization. For example, variation of such counterions as tetramethylammonium, alkyl benzyl dimethylammonium, sodium, potassium, ammonium, chloride, bisulfate and nitrate ions affects the solubility of the polymer.

The polymers may be cationic, anionic or nonionic. Generally, cationic and anionic polymers are preferred because of the greater latitude afforded to modify the solubility factors of the polymers. However, combinations of anionic and nonionic or cationic and nonionic polymers in the sizing system are sometimes desirable.

When the solubility factor of the polymers is modified by neutralization of the acidic or basic groups on the polymers, this refers to the extent of the neutralization. When the solubility factor of the polymers is modified by variation of the counterions, generally acids such as sulfuric acid, nitric acid, hydrochloric acid or acetic acid are sufficient and various bases such as potassium hydroxide, tetramethyl ammonium hydroxide, or sodium hydroxide are sufficient. Generally, it is preferred to use monovalent counterions because of the potential of the polymer to gel with the use of divalent and trivalent counterions.

Some of the nonionic polymers useful within the concepts of this invention include: dextrinized starches, poly(ethylene oxide), poly(acrylamide), poly(N-vinyl pyrrolidone) and poly(vinyl methylether). As stated above, the nonionic polymers do not have the latitude of the anionic and cationic polymers regarding adjusting the solubility factors thereof. Generally, varying the molecular weight distributions of the nonionic polymers to obtain the proper rate of solution is the best approach since their solution rates are not as sensitive to pH changes as are the anionic or cationic polymers.

Some of the cationic polymers useful within the concepts of this invention include: poly(ethylene imine), ethoxylated and propoxylated poly (ethylene imine), poly(N, N, N-trimethylaminoethylmethacrylate methylsulfate), and homopolymers and copolymers of N, N-dimethylaminoethyl methacrylate.

Some of the anionic polymers useful within the concepts of this invention include: poly(acrylic acid), poly(methacrylic acid), poly(sodium vinyl sulfonate) and copolymers of acrylic acid and methacrylic acid. Examples of copolymers of acrylic acid include poly(2-sulfoethyl methacrylate-co-acrylic acid) and poly(ethylene-co-acrylic acid).

The polymers useful within the concepts of this invention have solution rates which can be adjusted according to the needs of a particular process and/or according to the specific aqueous inorganic medium. The solubility characteristics of the polymers are tailor-made by altering the molecular weight of the polymers, neutralizing acidic or basic groups on the polymers, adjusting the pH of polymer solutions and by plasticizing the polymer.

It is preferred to use alkali resistant glass fibers, especially calcium hydroxide resistant glass fibers, with the concepts of this invention. Indicative of alkali resistant glass compositions, are those found in British patent specification No. 1,243,973 filed Aug. 4, 1967, and published Aug. 25, 1971, and those found in U.S. Pat. No. 3,499,776 issued on Mar. 10, 1970. Preferred alkali resistant glass fibers consist essentially by percent weight of: $SiO_2$, 60–62%; CaO, 4–6%; $Na_2O$, 14–15%; $K_2O$, 2–3%; $ZrO_2$, 10–11%; and $TiO_2$, 5.5–8%.

Although it is preferred to use alkali resistant glass fibers, use may be made of other commercially available glass fibers, such as those produced from E-glass. E-glass fibers are used in the practice of this invention when alkali attack is not a problem, such as in the manufacture of glass fiber sheets, mats and paper and in reinforcing gypsum.

In the past, asbestos fibers have been very successful as a reinforcement for many types of inorganic matrices because of the characteristics and ability of the asbestos fibers to disperse and to provide some entangled network. The entangled network is generally thought to be due to the non-uniformity of the length of the asbestos fibers, ranging anywhere from ¼ inch to 4 inches in length. In order to employ glass fibers as a suitable replacement for asbestos fibers, it is generally thought that some of the characteristics possessed by the asbestos fibers should be obtained with glass fibers. For this reason the length of the glass fibers may range from ⅛ inch to about 2 inches in length and preferably from ½ inch to 1 inch in length in order to obtain some entanglement of the glass fibers upon dispersion of the glass fibers in the inorganic matrix. Furthermore, many inorganic matrices are susceptible to crack propagation. By the use of these longer fibers the fibers traverse the cracks thereby adding strength to the matrix. Blends of various lengths of glass fibers are also desirable in order to obtain a multitude of properties.

The polymeric materials described above are formulated into sizings for application to glass fibers immediately after the glass fibers are formed to prevent the glass fibers from mutual abrasion and to provide a capability to the glass fibers, in the form of strands, bundles and rovings to be further processed. Subsequently, the sized glass fibers are gathered into a strand and collected onto a rotating collection package.

However, the sized glass fibers can be routed directly to a chopping apparatus, thereby eliminating the collection package, where the glass fibers are chopped into lengths ranging from about ⅛ inch to about 2 inches. When the strands are fed directly to the chopper, the chopper strands may be used immediately, without drying, in the aqueous media, or the chopped strands may be dried prior to or subsequent to chopping. When the strands are gathered onto a collection package, it is preferable to dry the package for about 10–30 hours at about 225°–275°F prior to positioning the package on a creel with numerous other packages so that a plurality of sized strands may be gathered to form a roving which may either be taken up on a collection package or fed directly to a chopping machine. Subsequent to chopping, the chopped strands can either be packaged for later use or be combined and mixed with an aqueous inorganic matrix to form a reinforced product.

The molecular weight of the water soluble polymer is not particularly critical to the concepts of this invention, except to the extent that molecular weight has a bearing upon the selection and amount of a "solution rate modifier." A solution rate modifier is defined as an additive to the water-soluble polymer, which alters the solution rate of the polymer in aqueous media. However, molecular weight is a design parameter to tailor the water soluble polymers with respect to solution rate and/or film-forming capability.

In most instances it is preferred to delay filamentization of the glass fibers from their strands until the strands have been uniformly mixed and distributed within the aqueous inorganic matrix, such as in the production of glass fiber reinforced cementitious products. However, there are instances when it is desired to have the glass fibers substantially instantaneously filamentize from a strand or bundle or roving upon incoporation of the glass fiber strand, bundle, or roving into an aqueous inorganic matrix, such as in the production of glass fiber sheets.

The sized glass fibers of this invention have been successfully used as a reinforcing material in various cementitious products or matrices including cement, Portland cement, concrete, mortar, gypsum, and hydrous calcium silicate.

The term hydrous calcium silicate denotes crystalline compounds formed by the reaction of lime (CaO), silica ($SiO_2$) and water. Two hydrous calcium silicates generally of interest are: tobermorite, having the formula $4 CaO . 5 SiO_2 . 5 H_2O$; and xonotlite, having the formula $5 CaO . 5 SiO_2 . 5 H_2O$. Hydrous calcium silicate products often are used as heat insulation materials.

Methods for reacting and drying a molded aqueous slurry of reactive cementitious constituents and reinforcing fibers to form hydrous calcium silicate insulation products are known in the art. One such method includes placing a molded slurry of the reactive cementitious constituents and reinforcing fibers in an autoclave, introducing pressurized saturated steam into the autoclave to indurate the slurry, simultaneously indurating and drying the slurry with superheated steam to convert this slurry to a final product and reducing the pressure in the autoclave to atmospheric pressure prior to removal of the product.

The sized glass fibers of this invention may be used alone or in combination with organic fibers, such as wood fibers in the production of cementitious products, especially calcium silicate products.

With specific reference to calcium silicate products, the principal slurry constituents, i.e., calcareous and siliceous materials, reinforcement fibers and water are mixed to form a slurry which is then molded to impart a predetermined shape to the slurry and final product. The slurry is molded or shaped in any convenient manner. Generally, however, one of two types of molds is employed, i.e., pan molds or filter press molds. In pan molds the slurry remains in the mold while the cementitious materials are reacted to convert them to a hydrous calcium silicate insulation. A pan mold generally defines a mold cavity of a particular shape and dimension; e.g., a flat rectangular pan is used to form flat ware or blocks, while an arcuate, generally U-shaped mold forms sectional insulation pieces which are later combined to form molded pipe coverings for insulating pipes, ducts, and the like. The filter press mold generally comprises a perforated mold over which the slurry is poured. A perforated mechanical piston complementary in shape to the mold, compresses the slurry to remove water to the point that the article is self-supporting. The filter press molding technique is described in U.S. Pat. No. 2,699,097 and is used to form pipe covering and flat ware. The slurry is maintained in the autoclave until a predetermined percentage of moisture of the ware has been removed by evaporation into a superheated steam atmosphere.

The specific lime to silica ratio of the slurry is dependent primarily upon the desired type of crystalline hydrous silicate desired in the final product. For example, it if is desired to obtain a crystalline product predominately composed of a crystalline matrix structure of the type commonly referred to as xonotlite, a $CaO/SiO_2$ mol ratio of approximately 1/1 would be utilized in the slurry. Control of the density of the resultant pan product is primarily accomplished by controlling the relative amount of water utilized in the make-up of the slurry. For example, an apparent density of 11 pounds per cubic foot, which is considered a nominal apparent density, would be obtained utilizing a slurry having a ratio of water to total dry solids of approximately 6:1.

The siliceous materials include Portland cement, siliceous sand, quartz, diatomaceous earth, clays, silica gel, perlite, and the like and mixtures thereof.

The calcareous materials include Portland cement, quicklime, slaked lime, and the like and mixtures thereof.

The organic materials are generally cellulosic materials, such as pulp fiber, cotton, straw, bagasse, wood flour, hemp, rayon, and the like and mixures thereof. A preferred pulp fiber is bleached soft wood pulp.

The organic materials generally have a diameter less than 30 microns as in the case of cotton fibers and may average less than 1 micron as in the case of wood pulp. The glass fibers generally have a diameter less than 0.001 inch, and are preferably dispersed in the insulation material as chopped individual fibers.

A crystalline hydrous calcium silicate insulation product is made from the following materials:

| Materials (Pan Batch) | Dry Weight Percent |
|---|---|
| Glass Fibers | 1.4 |
| Wood Pulp | 8.5 |
| Quicklime | 32.0 |
| Silica Flour | 22.0 |
| Diatomaceous Earth | 16.1 |
| Filler (Calcium Silicate Dust) | 9.6 |
| Bentonite Clay | 3.9 |
| Limestone | 3.9 |
| Liquid Sodium Silicate | 2.6 |
|  | 100.0 |

A dispersion of the various materials is made in water with a water-to-solids ratio of about 4.80/1. The dispersion is produced in a hydrapulper, placed in U-shaped mold forms and prehardened in a steam atmosphere at a temperature of about 190°F. These sectional insulation pieces are used as pipe covering and have a thickness of about 2 inches. The U-shaped molds filled with the dispersion then are placed in an autoclave. After the autoclave is sealed, the pressure in the autoclave is raised to about 250 psi over about a 15 minute cycle, and the molds are subjected to saturated steam at this pressure for about 60 minutes to indurate the dispersion. The temperature in the autoclave then is raised by heating coils to about 575°F to produce superheated steam which slowly indurates and dries the insulation over about a 175-minute period. The autoclave then is depressurized over about a ½ hour period, and the molds are then removed from the autoclave. The insulation so produced has a free-moisture content of about 15 percent by weight solids and a modulus of rupture of about 70 psi.

A crystalline hydrous calcium silicate insulation product is made from the following materials:

| Materials (Filter Press) | Dry Weight Percent |
|---|---|
| Glass Fibers | 1.3 |
| Wood Pulp | 8.7 |
| Hydrated Lime | 45.0 |
| Diatomaceous Earth | 45.0 |
|  | 100.0 |

A dispersion of the various materials is made in water at a temperature of about 200°F with a water-to-solids ratio of about 14.3/1. The dispersion is made in a hydrapulper and thereafter added to a gel tank and thoroughly mixed. The resulting slurry then is allowed to remain quiescent with slow stirring over short periods of time. The gel so produced then is allowed to stand for about 1 hour. The gel is charged to a precision type filter mold shaped to make pipe insulation with a wall thickness of about 1 inch. A ram in the mold compresses the gel to force the water out through a cylindrical filter forming the inside surface of the pipe insulation. The pipe insulation now has a water-to-solids ratio of about 4.0 to 4.5/1, which can be handled. The insulation is placed in an autoclave. After the autoclave is sealed, the pressure in the autoclave is raised to about 250 psi over about a 15 minute cycle. The insulation is then subjected to saturated steam at this pressure for about 90 minutes to indurate the insulation. The temperature in the autoclave then is raised by heating coils to about 540°F to produce superheated steam, which slowly indurates and dries the insulation over about a 125-minute period. The autoclave then is depressurized over about a ½-hour period and the insulation is removed from the autoclave. The insulation so produced has a free-moisture content of about 15 percent by weight solids and a modulus of rupture of about 97 psi.

DESCRIPTION OF THE PREFERRED EMBODIMENTS

EXAMPLE I

| Ingredients | Percent by Weight |
|---|---|
| Water soluble polymer | 0.5 – 50.0 |
| Solution rate modifier | to a pH of 2.0 – 10.0 |
| Water | Balance |

Coupling agents such as organo silanes or chrome complexes, are not required for the sizings of this invention, although they may be included therein. Likewise, lubricants, such as polyethylene glycol, are not required for the sizings of this invention, although they may be included therein. The lack of a need to use a lubricant may be due to the high solids content of the polymer in the sizing and to the solvation of the polymer in aqueous media, which provides a slippery surface to the glass fibers.

After the sizing is applied to glass fibers and the sized glass fibers are dried, the amount of dried coating on the glass fibers ranges from about 0.2 – 2.0 percent by weight solids and more preferably ranges from about 0.6 to about 0.8 percent by weight solids.

EXAMPLE II

| Ingredients | Percent by Weight (Solids) |
|---|---|
| Poly(ethylene imine) | 5.0 – 15.0 |
| Sulfuric acid (technical grade) | to a pH of 5.0 – 7.0 |
| Water (deionized) | Balance |

One poly(ethylene imine) is commercially available under the trade designation, "PEI–18" from Dow Chemical Corporation.

EXAMPLE III

| Ingredients | Percent by Weight (Solids) |
|---|---|
| Poly(acrylic acid) | 5.0 |
| Tetramethylammonium hydroxide | to a pH of 8.0 to 10.0 |
| Water | Balance |

EXAMPLE IV

| Ingredients | Percent by Weight (Solids) |
|---|---|
| High molecular weight poly(ethylene oxide) | 2.0 |
| Low molecular weight poly(ethylene oxide) | 5.0 |
| Sulfuric acid (technical grade) | to a pH of 4.0 – 5.0 |

| Ingredients | Percent by Weight (Solids) |
|---|---|
| Water | Balance |

One high molecular weight poly(ethylene oxide) is commercially available under the trade designation, "Poly-ox WSR–301" from Union Carbide Corporation. A low molecular weight poly(ethylene oxide) is commercially available under the trade designation, "CARBOWAX" from Union Carbide Corporation.

EXAMPLE V

| Ingredients | Percent by Weight (Solids) |
|---|---|
| Poly(methacrylic acid) | 4.0 |
| Low molecular weight poly(ethylene oxide) | 2.0 |
| Potassium hydroxide | to a pH of 8.0 to 10.0 |
| Water | Balance |

EXAMPLE VI

| Ingredients | Percent by Weight (Solids) |
|---|---|
| Poly(N,N,N-trimethylamino-ethylmethylacrylate methylsulfate) | 3.0 |
| High molecular weight poly(ethylene oxide) | 2.0 |
| Water | Balance |

EXAMPLE VII

| Ingredients | Percent by Weight (Solids) |
|---|---|
| Low molecular Weight poly(ethylene oxide) | 15.0 |
| Water | Balance |

Upon occasion, it is desirable to use a material other than an acid or base to alter the rate of solution of polymers in aqueous systems. An example of such a material is a plasticizer, such as glycerol. The following example is illustrative of this approach.

EXAMPLE VIII

| Ingredients | Percent by Weight (Solids) |
|---|---|
| Poly(acrylic acid) | 3.0 |
| Glycerol | 1.0 |
| Water | Balance |

The mixing procedure for the above examples comprises adding water to a mix tank followed by the addition of the polymer(s) to the tank, with agitation until the polymer(s) has completely dissolved. Thereafter, the solids and the pH of the sizing composition is adjusted within specifications. Alterations of the above-described mixing procedure may be made without departing from the scope of this invention.

We claim:

1. A product comprising an aqueous cementitious composition containing glass fibers having a size in contact with the surface of said fibers, said size consisting essentially of at least one water-soluble polymer and a solution rate modifier selected from the group consisting of sulfuric acid, nitric acid, hydrochloric acid, acetic acid, potassium hydroxide, tetramethylammonium hydroxide, sodium hydroxide and glycerol, said solution rate modifier being present in an amount sufficient to alter the rate of solution of said polymer in said aqueous cementitious composition.

2. The product of claim 1 in which said size has a pH within the range of 2 to 10.

3. The product of claim 1 in which said water-soluble polymer possesses an acidic group or a basic group which is neutralized by said solution rate modifier.

4. The product of claim 1 in which said polymer is anionic or cationic.

5. The product of claim 1 in which said polymer is a nonionic polymer selected from the group consisting of dextrinized starches, poly(ethylene oxide), poly(acrylamide), poly(N-vinyl pyrrolidone) and poly(vinylmethylether).

6. The product of claim 1 in which said polymer is a cationic polymer selected from the group consisting of poly(ethylene imine), ethoxylated poly(ethylene imine), propoxylated poly(ethylene imine), poly(N,N,N-trimethylaminoethylmethacrylate methylsulfate) and homopolymers and copolymers of N,N-dimethylaminoethyl methacrylate.

7. The product of claim 1 in which said polymer is an anionic polymer selected from the group consisting of poly(acrylic acid), poly(methyacrylic acid), poly(sodium vinyl sulfonate), and copolymers of acrylic acid and methacrylic acid.

8. The product of claim 1 in which said polymer is poly(ethylene imine) and said solution rate modifier is sulfuric acid.

9. The product of claim 1 in which said polymer is poly(acrylic acid) and said solution rate modifier is tetramethylammonium hydroxide.

10. The product of claim 1 in which said polymer is poly(acrylic acid) and said solution rate modifier is glycerol.

11. A method for producing a cementitious composition which comprises:
   a. dispersing glass fiber bundles throughout an aqueous cementitious composition to form a mixture, the surface of the glass fibers being in contact with a size consisting essentially of at least one water-soluble polymer and a solution rate modifier selected from the group consisting of sulfuric acid, nitric acid, hydrochloric acid, acetic acid, potassium hydroxide, tetramethylammonium hydroxide, sodium hydroxide and glycerol;
   b. agitating said mixture to filamentize said glass fiber bundles and to disperse the glass fibers throughout said cementitious composition.

12. The method of claim 11 in which said water-soluble polymer possesses an acidic group or a basic group which is neutralized by said solution rate modifier.

13. The method of claim 11 in which said polymer is anionic or cationic.

14. The method of claim 11 in which said polymer is a nonionic polymer selected from the group consisting of dextrinized starches, poly(ethylene oxide), poly(acrylamide) poly(N-vinyl pyrolidone) and poly(vinylmethylether).

15. The method of claim 11 in which said polymer is a cationic polymer selected from the group consisting of poly(ethylene imine), ethoxylated poly(ethylene imine), propoxylated poly(ethylene imine), poly(N,N,N-trimethylaminoethylmethocrylate methylsulfate), and homopolymers and copolymers of N,N-dimethylamineethyl methacrylate.

16. The method of claim 11 in which said polymer is an anionic polymer selected from the group consisting of poly(acrylic acid), poly(methacrylic acid), poly(sodium vinyl sulfonate), and copolymers of acrylic acid and methacrylic acid.

17. The method of claim 11 in which said polymer is poly(ethylene imine and said solution rate modifier is sulfuric acid.

18. The method of claim 11 in which said polymer is poly(acrylic acid) and said solution rate modifier is tetramethylammonium hydroxide.

19. The method of claim 11 in which said polymer is poly(acrylic acid) and said solution rate modifier is glycerol.

* * * * *